US012691471B2

(12) United States Patent
Fukuda et al.

(10) Patent No.: US 12,691,471 B2
(45) Date of Patent: Jul. 28, 2026

(54) OBJECT IMAGING APPARATUS AND OBJECT RECOGNITION APPARATUS

(71) Applicant: PFU LIMITED, Ishikawa (JP)

(72) Inventors: Kenichi Fukuda, Ishikawa (JP); Nozomi Ogi, Ishikawa (JP)

(73) Assignee: PFU Limited, Ishikawa (JP)

( * ) Notice: Subject to any disclaimer, the term of this patent is extended or adjusted under 35 U.S.C. 154(b) by 78 days.

(21) Appl. No.: 18/987,440

(22) Filed: Dec. 19, 2024

(65) Prior Publication Data

US 2025/0205747 A1　Jun. 26, 2025

(30) Foreign Application Priority Data

Dec. 26, 2023　(JP) ................................. 2023-219691

(51) Int. Cl.
| | |
|---|---|
| *B07C 5/342* | (2006.01) |
| *B07C 5/34* | (2006.01) |
| *G01N 21/84* | (2006.01) |
| *G06V 10/141* | (2022.01) |

(52) U.S. Cl.
CPC .......... *B07C 5/3422* (2013.01); *B07C 5/3408* (2013.01); *G01N 21/84* (2013.01); *G06V 10/141* (2022.01); *B07C 2501/0054* (2013.01); *G01N 2021/845* (2013.01); *G06V 2201/06* (2022.01)

(58) Field of Classification Search
CPC ................ B07C 5/3422; B07C 5/3408; B07C 2501/0054; G06V 10/141; G06V 2201/06; G01N 21/84; G01N 2021/845
See application file for complete search history.

(56) References Cited

U.S. PATENT DOCUMENTS

2023/0364651 A1　11/2023　Hongo et al.
2024/0171694 A1*　5/2024　Sugizaki .............. H04N 1/1225

FOREIGN PATENT DOCUMENTS

WO　　2022/162978 A1　8/2022
WO　　2022/190407 A1　9/2022

* cited by examiner

*Primary Examiner* — Georgia Y Epps
*Assistant Examiner* — Don J Williams
(74) *Attorney, Agent, or Firm* — Rimon P.C.

(57) ABSTRACT

An object imaging apparatus includes a housing, a light source inside the housing, a first reflector inside the housing to diffusely reflect light from the light source, a second reflector inside the housing to guide at least a part of light from the light source to the first reflector, and an imager to image an object irradiated with the light from the first reflector. A diffuse reflectance of the first reflector is higher than a diffuse reflectance of the second reflector.

10 Claims, 11 Drawing Sheets

OBJECT IMAGING APPARATUS AND OBJECT RECOGNITION APPARATUS

CROSS-REFERENCE TO RELATED APPLICATION

This patent application is based on and claims priority pursuant to 35 U.S.C. § 119(a) to Japanese Patent Application No. 2023-219691, filed on Dec. 26, 2023, in the Japan Patent Office, the entire disclosure of which is hereby incorporated by reference herein.

BACKGROUND

The present disclosure relates to an object imaging apparatus and an object recognition apparatus.

Object recognition apparatuses provided in automatic recyclable waste sorting apparatuses are known. Some types of such object recognition apparatuses include an object imaging apparatus that images recyclable waste while irradiating the recyclable waste conveyed by a belt conveyor with light from a light source located in the housing.

SUMMARY

An object imaging apparatus according to one aspect of the present disclosure includes a housing, a light source inside the housing, a first reflector inside the housing to diffusely reflect light from the light source, a second reflector inside the housing to guide at least a part of light from the light source to the first reflector, and an imager to image an object irradiated with the light from the first reflector. A diffuse reflectance of the first reflector is higher than a diffuse reflectance of the second reflector.

An object recognition apparatus according to another aspect of the present disclosure includes the object imaging apparatus according to the above-described aspect and circuitry to recognize the object based on a captured image obtained by imaging the object by the imager.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
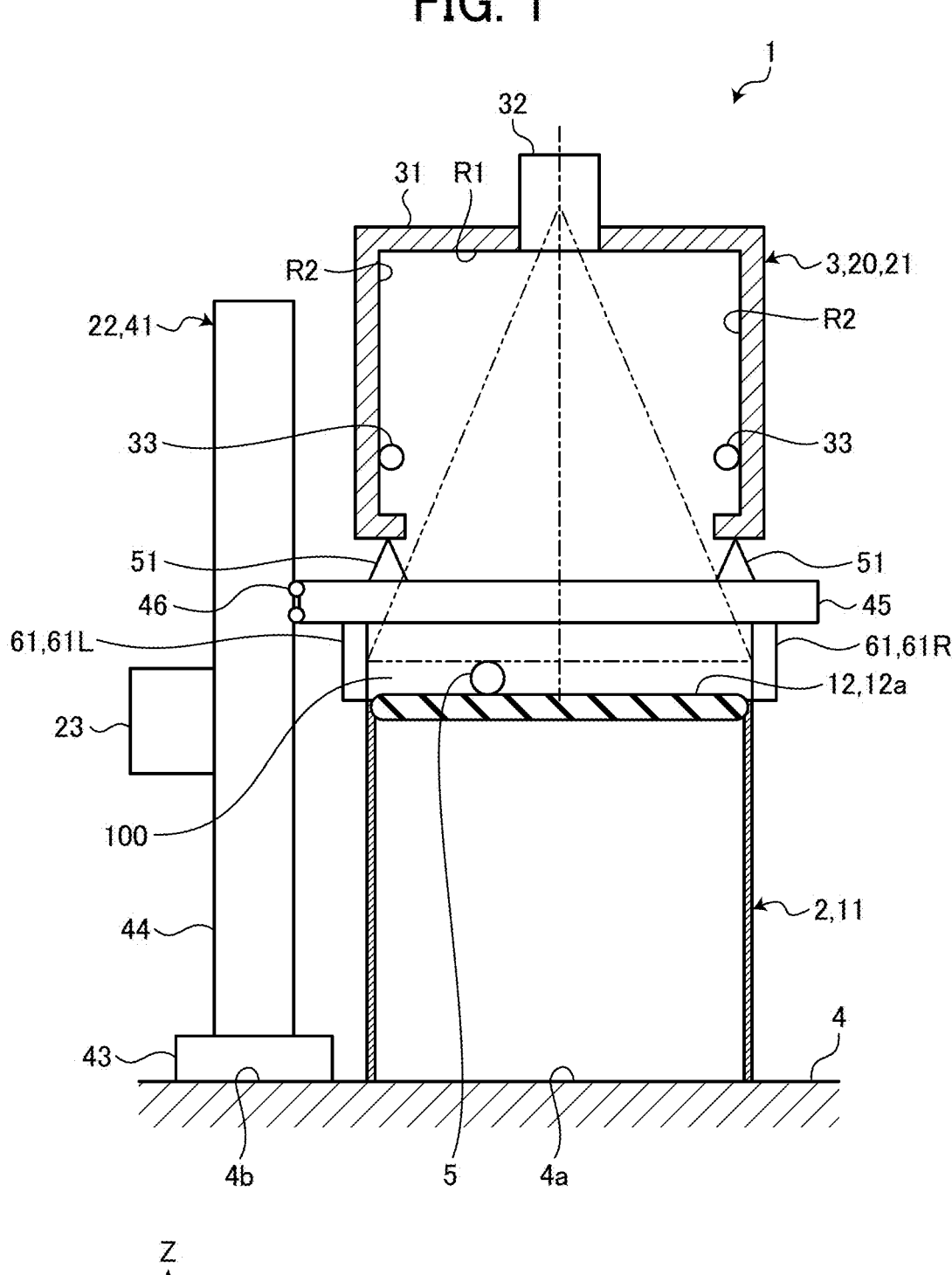
FIG. 1 is a cross-sectional view of a part of an automatic recyclable waste sorting apparatus including an object recognition apparatus according to the first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An object imaging apparatus and an object recognition apparatus according to some embodiments are described below with reference to the drawings. The technologies of the present disclosure are not limited to those in the following description. In the following description, like reference signs denote like elements, and redundant descriptions thereof are simplified or omitted.

The drawings are illustrative, and the dimensional relationship between elements, the ratio between elements, and the like may be different from the actual ones. The drawings may include parts whose dimensional relationships and ratios are different from one another.

In the present disclosure, ordinal numbers are used only for distinguishing components, members, portions, positions, directions, and the like, and do not indicate order or priority.

Figure 2:
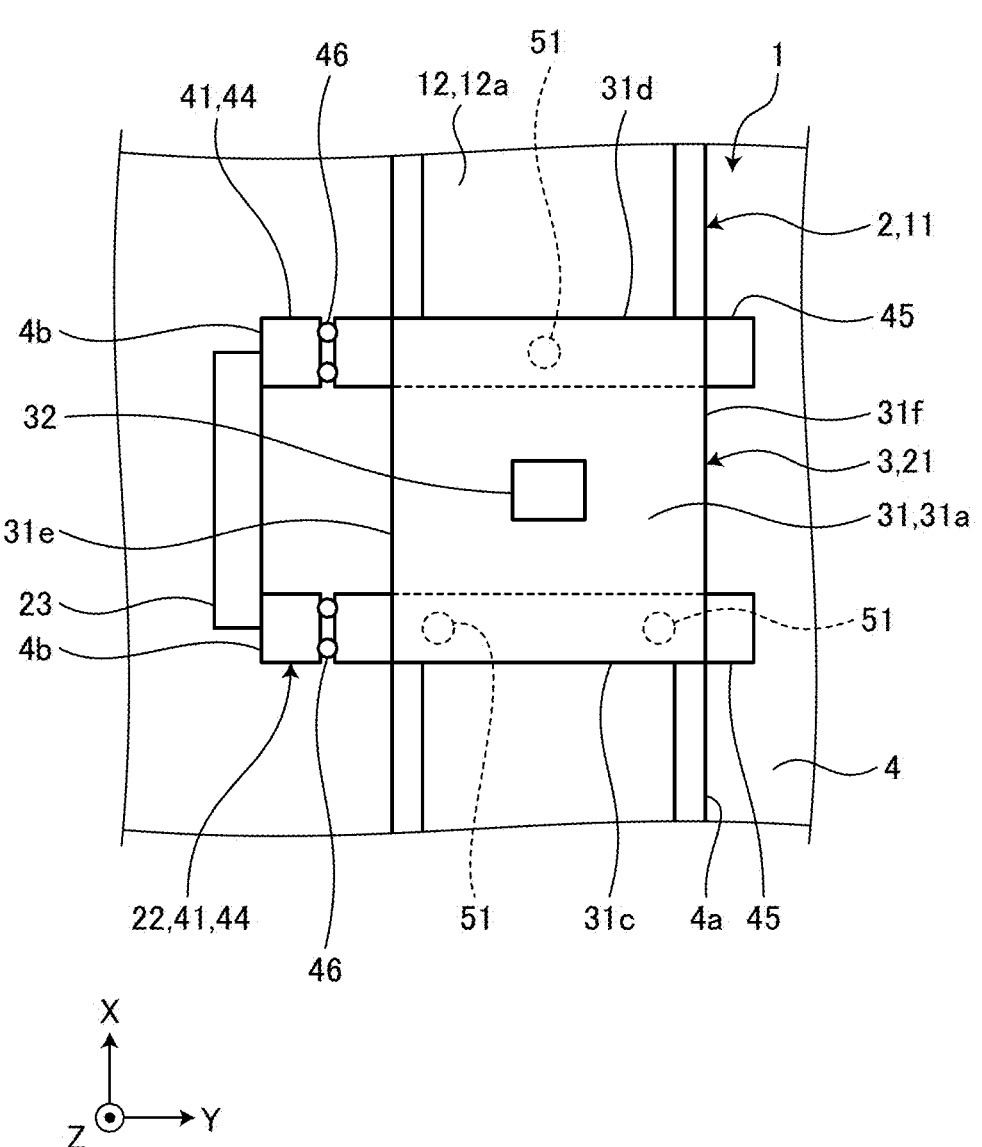
FIG. 2 is a plan view of a part of the automatic recyclable waste sorting apparatus including the object recognition apparatus according to the first embodiment.

First Embodiment FIG. 1 is a cross-sectional view of a part of an automatic recyclable waste sorting apparatus 1 including an object recognition apparatus 3 according to the first embodiment. FIG. 2 is a plan view of a part of the automatic recyclable waste sorting apparatus 1 including the object recognition apparatus 3 according to the first embodiment.

As illustrated in FIG. 1 and FIG. 2, the automatic recyclable waste sorting apparatus 1 includes a belt conveyor 2, an object recognition apparatus 3, and a removal apparatus.

The belt conveyor 2 conveys an object 5 such as recyclable waste. Examples of the recyclable waste include a plastic bottle and a glass bottle. The object recognition apparatus 3 images the object 5 conveyed by the belt conveyor 2 and recognizes the object 5 based on a captured image obtained by the imaging. The removal apparatus moves a recyclable waste of a particular material recognized by the object recognition apparatus 3 to a particular position. The automatic recyclable waste sorting apparatus 1 is located on a floor surface 4 of a facility such as a recyclable waste recycling facility. The belt conveyor 2 is an example of a conveying apparatus.

The belt conveyor 2 includes a belt conveyor frame 11, a belt 12, and a belt driving source. The belt conveyor 2 is located on a first installation portion 4a of the floor surface 4. The belt conveyor 2 is an example of a conveying apparatus, and the belt 12 is an example of a conveyor.

As illustrated in the drawings, an X-axis, a Y-axis, and a Z-axis are defined for the sake of explanatory convenience in the present disclosure. The X-axis, the Y-axis, and the Z-axis are perpendicular to each other. The X-axis is along the conveying direction of the belt conveyor 2. The Y-axis is along the width direction of the belt 12 of the belt conveyor 2. The Z-axis is along the height directions (up-down direction) of the belt conveyor 2 and the object recognition apparatus 3. The width direction of the belt 12 is also referred to as a "left-right direction."

Further, in the present disclosure, an X-direction, a Y-direction, and a Z-direction are defined. The X-direction is a direction along the X-axis, and includes a +X-direction indicated by the arrow of the X-axis and a −X-direction opposite to the arrow of the X-axis. The Y-direction is a direction along the Y-axis, and includes a +Y-direction indicated by the arrow of the Y-axis and a −Y-direction opposite to the arrow of the Y-axis. The Z-direction is a direction along the Z-axis, and includes a +Z-direction indicated by the arrow of the Z-axis and a −Z-direction opposite to the arrow of the Z-axis. In the following description, the +Z-direction is defined as a vertically upward direction, and the −Z-direction is defined as a vertically downward direction.

The belt conveyor frame 11 is located on the first installation portion 4a of the floor surface 4. The belt 12 is formed of a flexible material and is formed into a loop-shaped band. The belt 12 is supported by the belt conveyor frame 11 via multiple pulleys. The object 5 is placed on an upper face 12a of the belt 12. The belt driving source rotates the pulleys to move the upper face 12a of the belt 12 in parallel. Thus, the upper face 12a of the belt 12 conveys the object 5 in the conveying direction (i.e., +X-direction).

The object recognition apparatus 3 includes an object imaging apparatus 20 and a controller 23. The object imaging apparatus 20 images the object 5 on the belt 12 of the belt conveyor 2. The controller 23 controls the units of the object recognition apparatus 3 and recognizes the object 5 imaged by the object imaging apparatus 20.

The object imaging apparatus 20 includes an optical unit 21, a supporter 22, and a pair of a left side plate 61L and a right side plate 61R. The optical unit 21 is located above the belt 12. The supporter 22 is located on a second installation portion 4b of the floor surface 4 and supports the optical unit 21 to adjust the position of the optical unit 21 in the downward direction. The pair of left side plate 61L and right side plate 61R are located below the optical unit 21. In the following description, the pair of left side plate 61L and right side plate 61R may be collectively referred to as a "pair of side plates 61" or "side plates 61." The optical unit 21 is an example of an imaging device, and the side plates 61 is an example of plates.

The optical unit 21 faces the belt 12 and images the object 5 conveyed by the belt 12. The optical unit 21 includes a housing 31, an imager 32, and multiple light sources 33.

Figure 3:
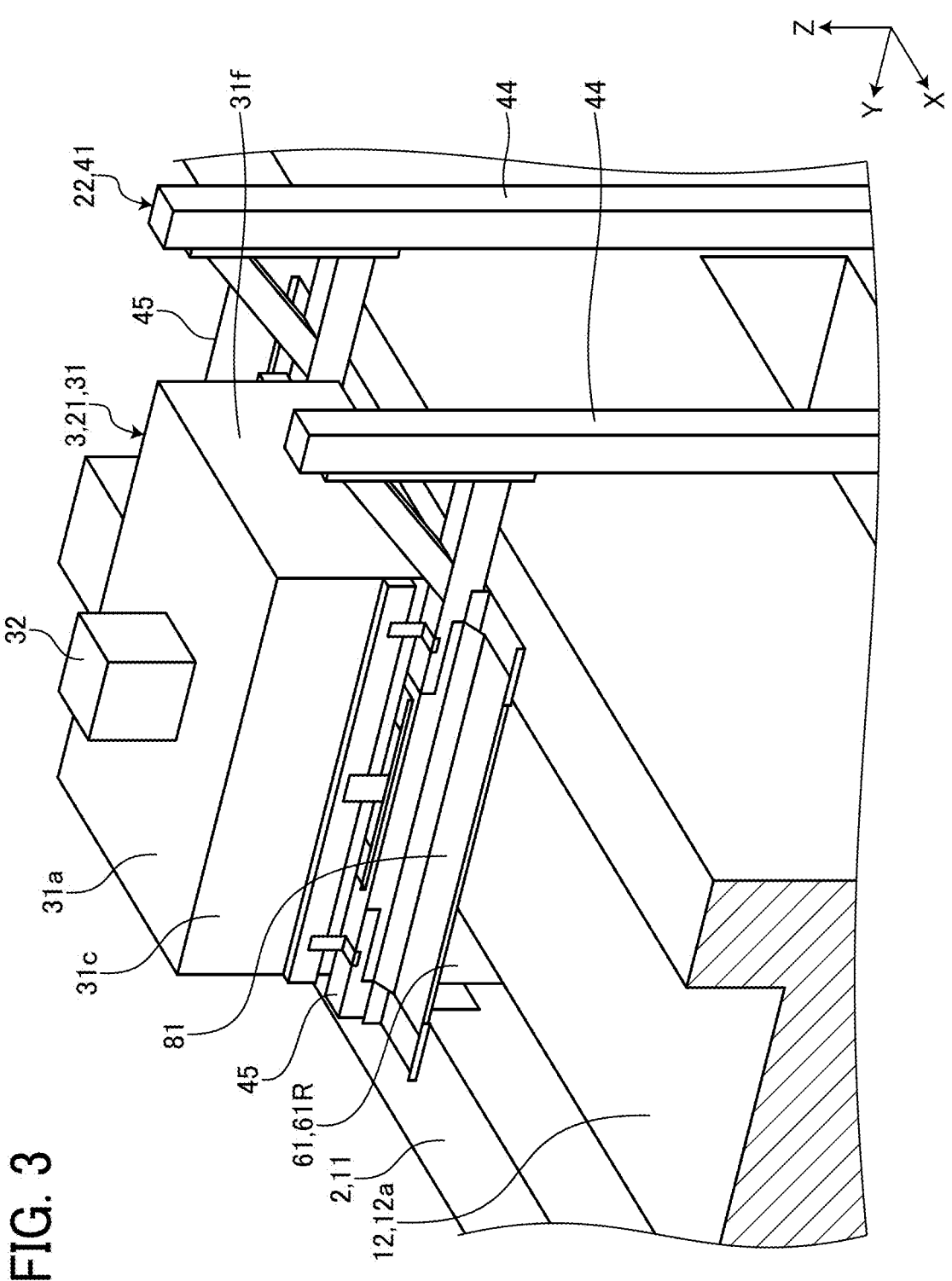
FIG. 3 is a perspective view of a part of the automatic recyclable waste sorting apparatus including the object recognition apparatus according to the first embodiment.

FIG. 3 is a perspective view of a part of the automatic recyclable waste sorting apparatus including the object recognition apparatus 3 according to the first embodiment. As illustrated in FIG. 1 and FIG. 3, the housing 31 is located above the upper face 12a of the belt 12 and faces the upper face 12a of the belt 12. In other words, the housing 31 faces the belt 12 in the up-down direction (i.e., Z-direction). The housing 31 is made of a material that does not transmit light. The housing 31 houses the light sources 33 therein.

Figure 4:
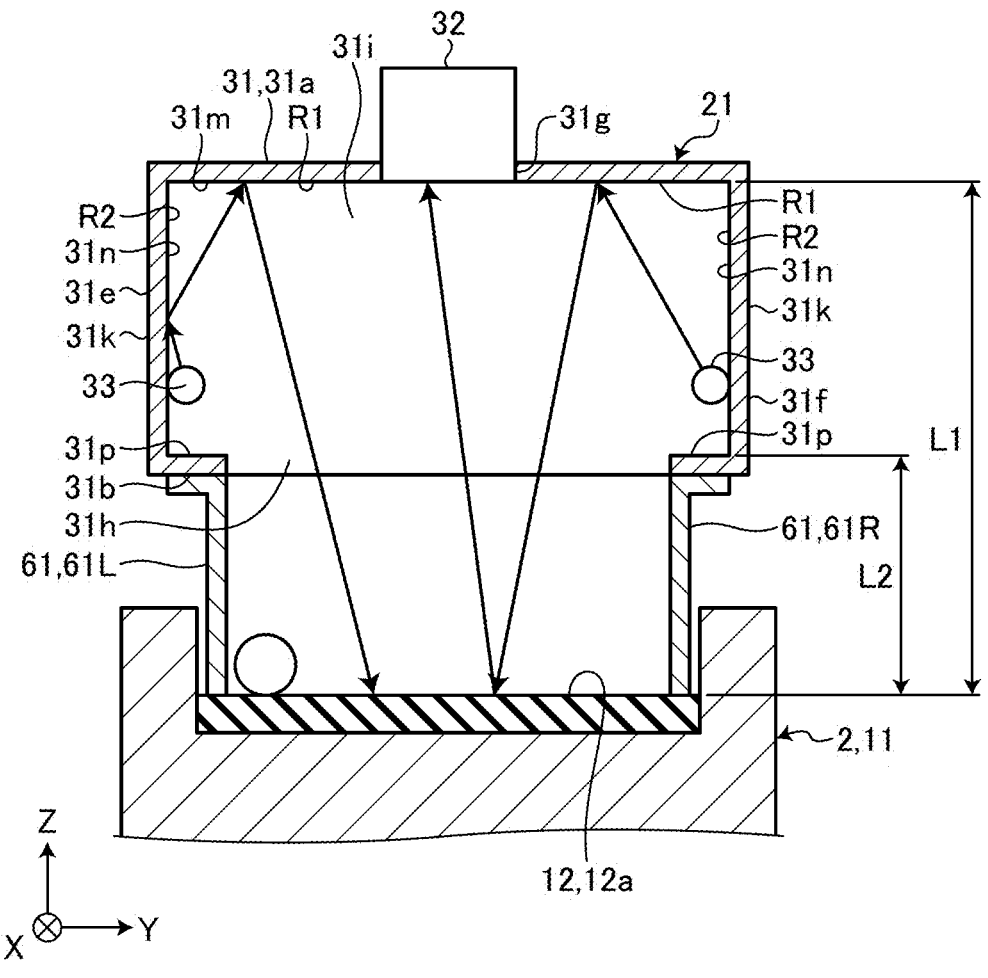
FIG. 4 is a cross-sectional view of a part of an object imaging apparatus according to the first embodiment and a belt conveyor.

FIG. 4 is a cross-sectional view of the optical unit 21 of the object imaging apparatus 20 according to the first embodiment. As illustrated in FIG. 2 to FIG. 4, the housing 31 has, for example, a substantially rectangular parallelepiped box shape. The housing 31 has walls such as a top wall 31a, a bottom wall 31b, a front wall 31c, a rear wall 31d, a left wall 31e, and a right wall 31f. The walls such as the front wall 31c, the rear wall 31d, the left wall 31e, and the right wall 31f includes, for example, a reflection plate. The reflection face of the reflection plate constitutes the inner face of the housing 31. The top wall 31a is also referred to as a base wall or an upper wall. The bottom wall 31b is also referred to as a lower wall. The top wall 31a is also referred to as an upper wall. The front wall 31c, the rear wall 31d, the left wall 31e, and the right wall 31f are also referred to as peripheral walls.

The top wall 31a and the bottom wall 31b extend in a direction intersecting (e.g., perpendicular to) the up-down direction (i.e., the Z-direction). In other words, the top wall 31a and the bottom wall 31b extend along the X-Y plane. The top wall 31a and the bottom wall 31b are located substantially parallel to each other with a space therebetween in the up-down direction. The top wall 31a and the bottom wall 31b may be inclined relative to the up-down direction (i.e., Z-direction). The top wall 31a includes a through-hole 31g penetrating the top wall 31a in the up-down direction. The bottom wall 31b includes a through-hole 31h penetrating the bottom wall 31b in the up-down direction. The inner face of the top wall 31a constitutes a base face 31m. The base face 31m is located away from the belt 12. The inner face of the bottom wall 31b constitutes a bottom face 31p.

The front wall 31c and the rear wall 31d extend in a direction perpendicular to the conveying direction (i.e., X-direction) of the belt conveyor 2. In other words, the front wall 31c and the rear wall 31d extend along the Y-Z plane. The front wall 31c and the rear wall 31d are located substantially parallel to each other with a space therebetween in the conveying direction of the belt conveyor 2. The front wall 31c and the rear wall 31d may be inclined relative to the conveying direction of the belt conveyor 2. An overhang 81 is provided on the outer face of the front wall 31c as illustrated in FIG. 3.

The left wall 31e and the right wall 31f extend in a direction perpendicular to the width direction (i.e., the Y-direction) of the belt 12 of the belt conveyor 2. In other words, the left wall 31e and the right wall 31f extend along the X-Z plane. The left wall 31e and the right wall 31f are located substantially parallel to each other with a space therebetween in the width direction of the belt 12. The left wall 31e and the right wall 31f may be inclined relative to the width direction of the belt 12.

The front wall 31c, the rear wall 31d, the left wall 31e, and the right wall 31f constitute sidewalls 3k. The inner faces of the sidewalls 3k constitute side faces 31n. The side faces 31n extends from the base face 31m toward the belt 12.

A space 31i is provided inside the housing 31. The space 31i is surrounded by the inner faces 31j of the top wall 31a, the bottom wall 31b, the front wall 31c, the rear wall 31d, the left wall 31e, and the right wall 31f. In other words, the inner faces 31j of the top wall 31a, the bottom wall 31b, the front wall 31c, the rear wall 31d, the left wall 31e, and the right wall 31f form the space 31i. The space 31i communicates with the through-hole 31h of the bottom wall 31b, and is open to the outside of the housing 31 on the belt 12 side via the through-hole 31h.

A first area R1 and second areas R2 are provided inside the housing 31.

The first area R1 is provided on the base face 31m. The first area R1 is, for example, the entirety of the base face 31m. Alternatively, the first area R1 may be a part of the base face 31m. The first area R1 extends in a direction intersecting the −Z-direction from the first area R1 toward the belt 12. The first area R1 may extend in a direction perpendicular to the −Z-direction or may extend in a direction inclined relative to the −Z-direction. The first area R1 diffusely reflects light from the light sources 33. The −Z-direction is an example of a first direction.

The second areas R2 are provided on the side faces 31n, respectively. The second area R2 is, for example, the entirety of the side face 31n. The second area R2 may be a part of each of the side face 31n. The second area R2 extends along the −Z-direction relative to the first area R1. The second areas R2 reflect at least a part of light from the light sources 33 to the first area R1. In other words, the second areas R2 guide at least a part of light from the light sources 33 to the first area R1. The second areas R2 may guide only a part of light from the light sources 33 to the first area R1, or may guide all of light from the light sources 33 to the first area R1. A length (shortest length) L1 between the second area R2 and the belt 12 is shorter than a length L2 (shortest length) between the first area R1 and the belt 12.

The diffuse reflectance of the first area R1 is higher than the diffuse reflectance of the second area R2. In other words, multiple portions having different diffuse reflectances are provided inside the housing 31. For example, the higher the smoothness or glossiness of a surface, the lower the diffuse reflectance, the lower the smoothness or glossiness of a surface, the higher the diffuse reflectance. Therefore, in the present embodiment, the smoothness and glossiness of the first area R1 are lower than the smoothness and glossiness of the second area R2. In other words, the smoothness and glossiness of the second area R2 are higher than the smoothness and glossiness of the first area R1. For example, the glossiness of the first area R1 is equal to or less than 50%, and the glossiness of the second area R2 is equal to or more than 80%, but is not to limited thereto.

The reflectance and the diffuse reflectance are described below. Incident light that is incident on the surface of a material (object) is reflected specularly or diffusely on the surface, or transmitted from the surface into the material. The light that is specularly reflected is referred to as "specular reflection light." The light that is diffusely reflected is referred to as "diffuse reflection light." The light that is transmitted is referred to as "transmitted and absorbed light."

The reflectance is the ratio of incident light to reflected light, which is light that is reflected off a surface without being transmitted or absorbed by a material. When the incident light is Ra, the diffuse reflection light is Rb, and the specular reflection light is Rc, the reflectance is expressed by the following equation.

$$\text{Reflectance} = (Rb + Rc)/Ra$$

The reflectance is determined based on, for example, the smoothness of the surface, the color of the surface, and a combination thereof.

The diffuse reflectance is the ratio of diffused light to reflected light, and is expressed by the following equation.

$$\text{Diffuse reflectance} = Rb/(Rb + Rc)$$

When the diffuse reflectance is 100%, the surface is a perfect diffusion surface. When the diffuse reflectance is 0%, the surface is a specular surface.

The imager 32 is located on the top wall 31a of the housing 31. For example, the imager 32 is fitted into the through-hole 31g in the top wall 31a. An imaging area 34 of the imager 32 reaches the outside of the housing 31 through the through-hole 31h in the bottom wall 31b of the housing 31. The imaging plane (focal plane) on which an image imaged by the imager 32 is in focus is outside the housing 31 by a predetermined distance from the bottom end of the housing 31. The imager 32 is, for example, a so-called digital camera. The imager may include an imaging sensor. The imager 32 has an optical axis oriented downward and images the object 5 conveyed on the upper face 12a of the belt 12 through the inside of the housing 31. In other words, the imager 32 images the object 5 conveyed on the upper face 12a of the belt 12 through the space 31i. The imager 32 images the object 5 irradiated with light from the first area R1 of the housing 31. The imager 32 outputs a captured image, which is a result of imaging. The captured image is formed of multiple pixels arranged in the image. The pixels are associated with multiple pieces of color information. Each of the pieces of color information indicates, for example, a red gradation value, a green gradation value, and a blue gradation value. The image may be a monochrome image. In this case, the color information indicates one gradation value.

As illustrated in FIG. 4, the light sources 33 are located in the space 31i of the housing 31, i.e., inside the housing 31. Specifically, the light sources 33 are located in the lower space in the housing 31 near the belt 12 and fixed to the side wall 31k. The light sources 33 emit light to the inside of the housing 31. In other words, the light sources 33 emit light to the space 31i. For example, the light sources 33 emit light upward inside the housing 31. In other words, the light sources 33 emit light upward in the space 31i. A part of the light emitted from the light sources 33 is reflected on the second area R2 of the housing 31 and is incident on the first area R1. A part of the light emitted from the light sources 33 is directly incident on the first area R1 of the housing 31. The light incident on the first area R1 is reflected diffusely on the first area R1, and irradiates the upper face 12a of the belt 12 and the object 5 placed on the upper face 12a. At least a part of the light incident on the object 5 is reflected by the object 5 and reaches the imager 32. The light sources 33 emit, for example, visible light as light. The light emitted from the light sources 33 is reflected by the inner face 31j of the housing 31 toward the belt 12.

As illustrated in FIG. 1, the supporter 22 is located on the second installation portion 4*b* of the floor surface 4. The second installation portion 4*b* is a portion different from the first installation portion 4*a* in which the belt conveyor 2 is located on the floor surface 4. In other words, the second installation portion 4*b* is a portion different from the first installation portion 4*a*. The supporter 22 supports the optical unit 21. In the following description, the term "facing direction" refers to a direction in which the belt 12 and the optical unit 21 face each other unless otherwise specified. As illustrated in FIG. 1 and FIG. 2, the supporter 22 includes multiple (e.g., two) structures 41. The two structures 41 are arranged at an interval in the conveying direction of the belt conveyor 2 (i.e., X-direction).

The structures 41 include a base 43, a pillar 44, a beam 45, a joint 46, and a joint 51.

The base 43 is fixed to the second installation portion 4*b* of the floor surface 4. The pillar 44 is fixed to the base 43 and extends upward from the base 43. In other words, the pillar 44 extends in the facing direction in which the optical unit 21 and the belt 12 face each other, (i.e., the Z-direction). The pillar 44 is made of, for example, H-shaped steel or T-shaped steel, but is not limited thereto. The base 43 and the pillar 44 are aligned with the belt conveyor 2 in the width direction of the belt conveyor 2 (i.e., the Y-direction). In other words, the base 43 and the pillar 44 are located beside the belt conveyor 2. The base 43 and the pillar 44 are made of, for example, a metal material.

The beam 45 is coupled to the pillar 44 by the joint 46. The beam 45 is supported by the pillar 44 in a cantilever manner. The beam 45 is above the belt 12 and faces the upper face 12*a* of the belt 12. The optical unit 21 is located on the beam 45. The beam 45 supports the optical unit 21 via the joint 51. In other words, the optical unit 21 is located opposite to the belt 12 relative to the beam 45 and is supported by the beam 45.

Figure 5:
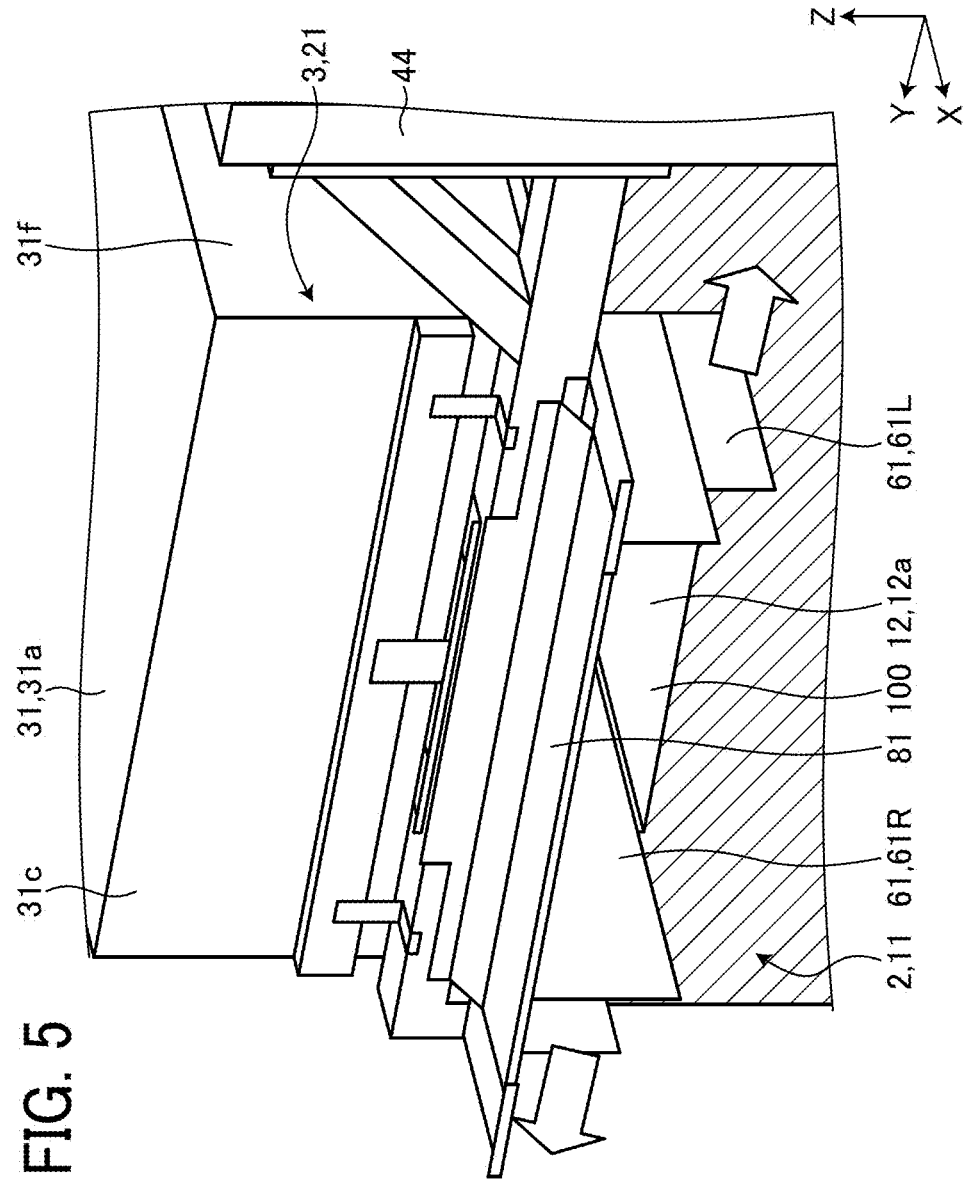
FIG. 5 is a perspective view of a part of the object imaging apparatus according to the first embodiment and the belt conveyor, and is a view illustrating a state where the interval between a pair of side plates is widened.
Figure 6:
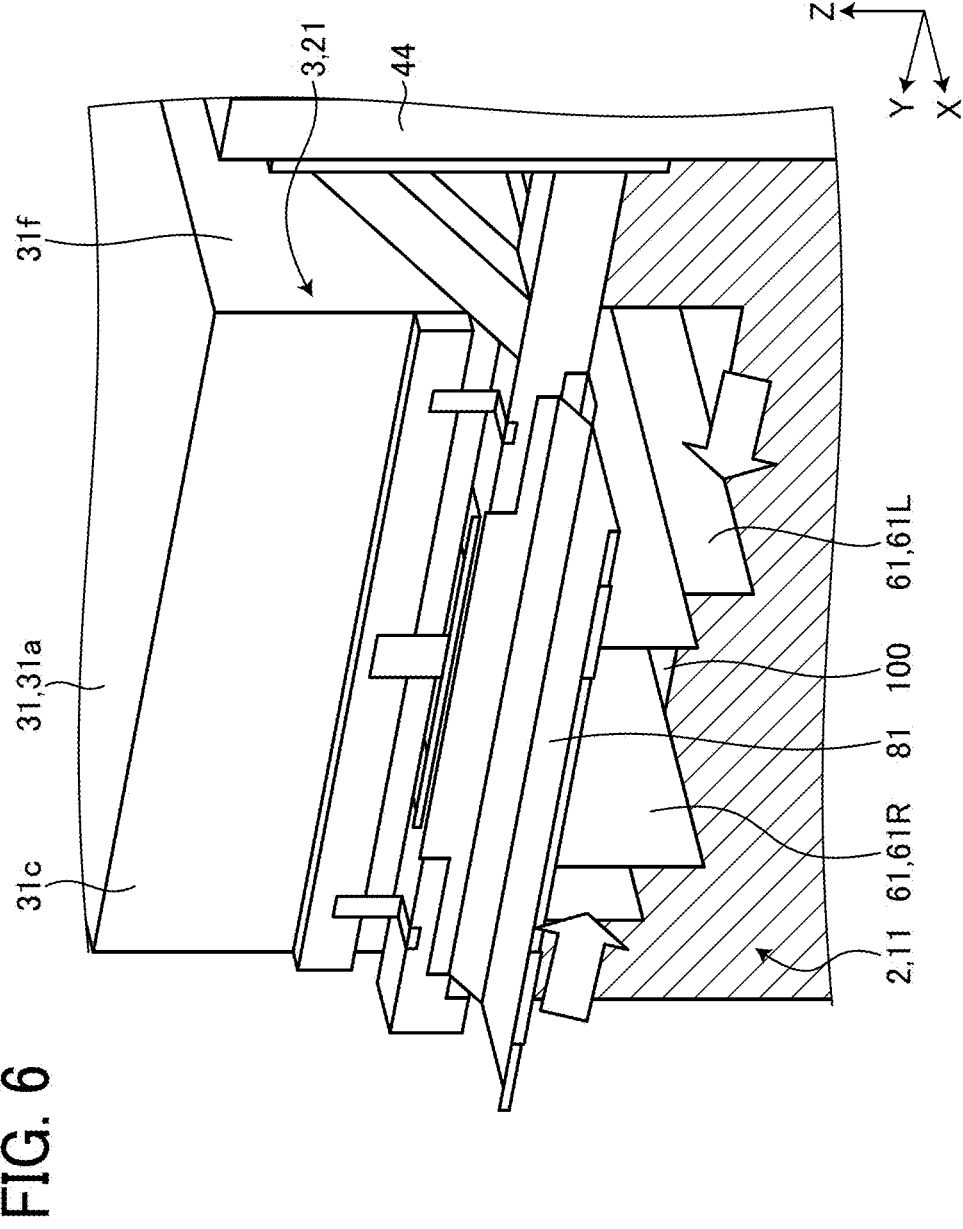
FIG. 6 is a perspective view of a part of the object imaging apparatus according to the first embodiment and the belt conveyor, and is a view illustrating a state where the interval between the pair of side plates is narrowed.
Figure 7:
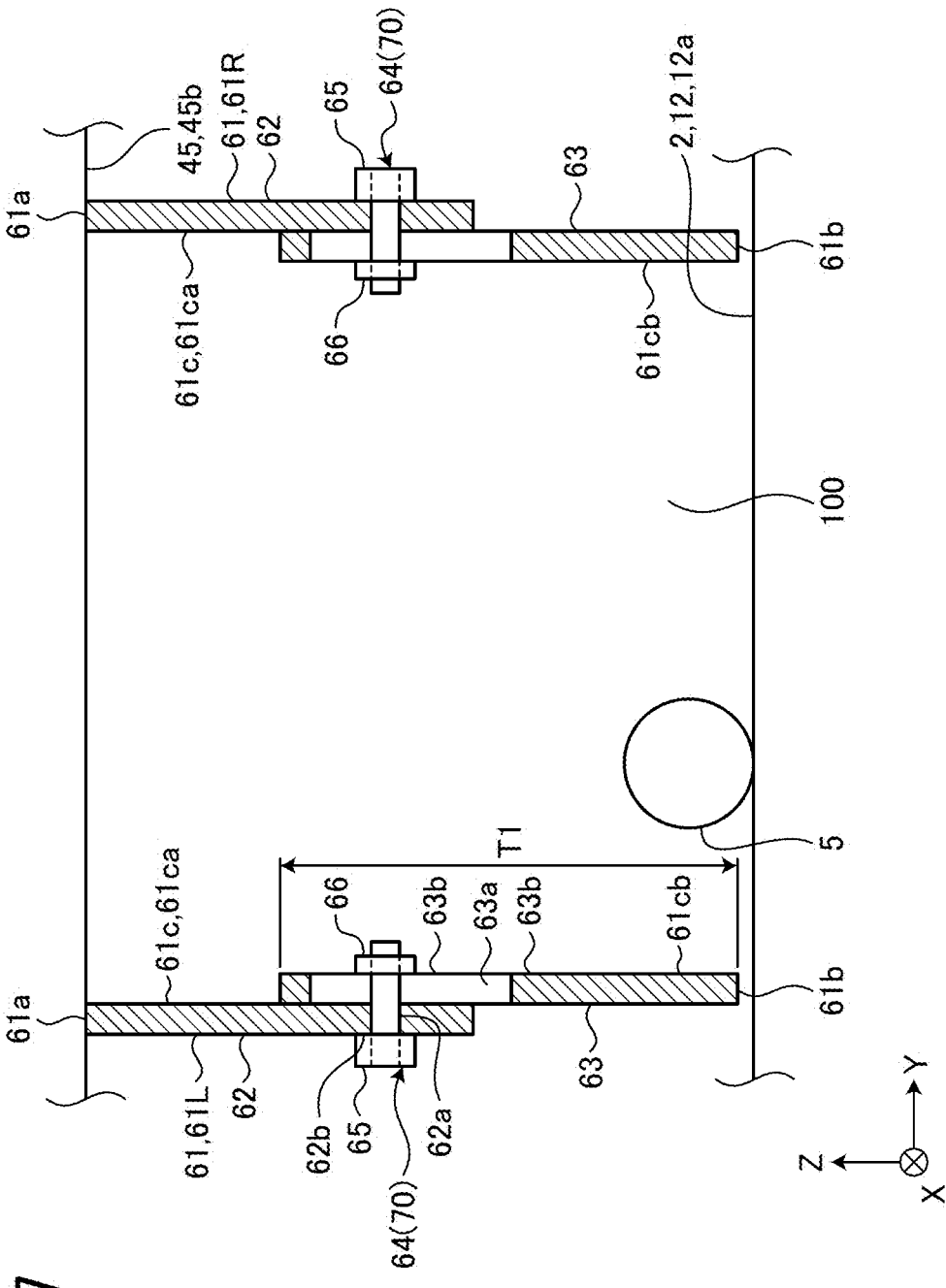
FIG. 7 is a diagram illustrating the side plates of the object imaging apparatus according to the first embodiment.

FIG. 5 is a perspective view of a part of the object imaging apparatus 20 and the belt conveyor 2 according to the first embodiment, and is a view illustrating a state where the interval between the pair of side plates 61 is widened. FIG. 6 is a perspective view of a part of the object imaging apparatus 20 and the belt conveyor 2 according to the first embodiment, and is a view illustrating a state where the interval between the pair of side plates 60 is narrowed. FIG. 7 is a diagram illustrating the side plates 61 of the object imaging apparatus 20 according to the first embodiment.

As illustrated in FIG. 5 to FIG. 7, the pair of side plates 61 are coupled to the beams 45 and arranged at an interval in the width direction (Y direction) of the belt 12 (i.e., the Y-direction). The pair of side plates 61 are not coupled to the belt conveyor frame 11 of the belt conveyor 2. The pair of side plates 61 sandwich a space 100 between the optical unit 21 and the belt 12. The optical unit 21 can image the object 5 between the pair of side plates 61.

As illustrated in FIG. 7, the side plate 61 is formed by combining multiple members. For example, each of the side plates 61 includes a first plate member 62 and a second plate member 63. The first plate member 62 includes an upper end 61*a* of the side plate 61. The second plate member 63 includes a lower end 61*b* of the side plate 61. The first plate member 62 is coupled to the beam 45. The second plate member 63 is coupled to the first plate member 62 with a part of the second plate member 63 overlapping the first plate member 62. The second plate member 63 is coupled to the first plate member 62 to be slidable in the upward direction relative to the first plate member 62. The second plate member 63 is, for example, a black acrylic plate, but is not limited thereto.

A plate position adjuster 70 can adjust at least one (e.g., both) of the interval between the pair of side plates 61 in the width direction of the belt 12 and the positions of the pair of side plates 61 in the direction in which the belt 12 and the optical unit 21 face each other (i.e., the Z-direction).

Figure 8:
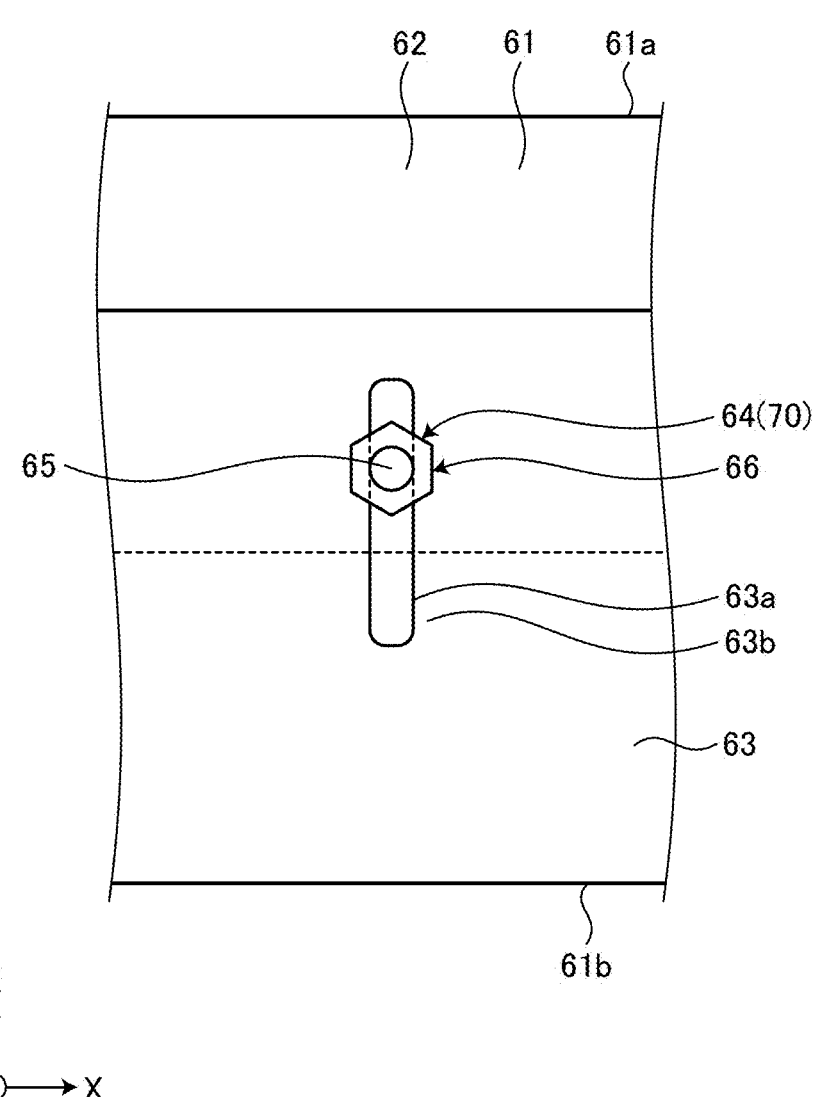
FIG. 8 is a diagram illustrating an up-down direction adjuster in a plate position adjuster of the object imaging apparatus according to the first embodiment.
Figure 9:
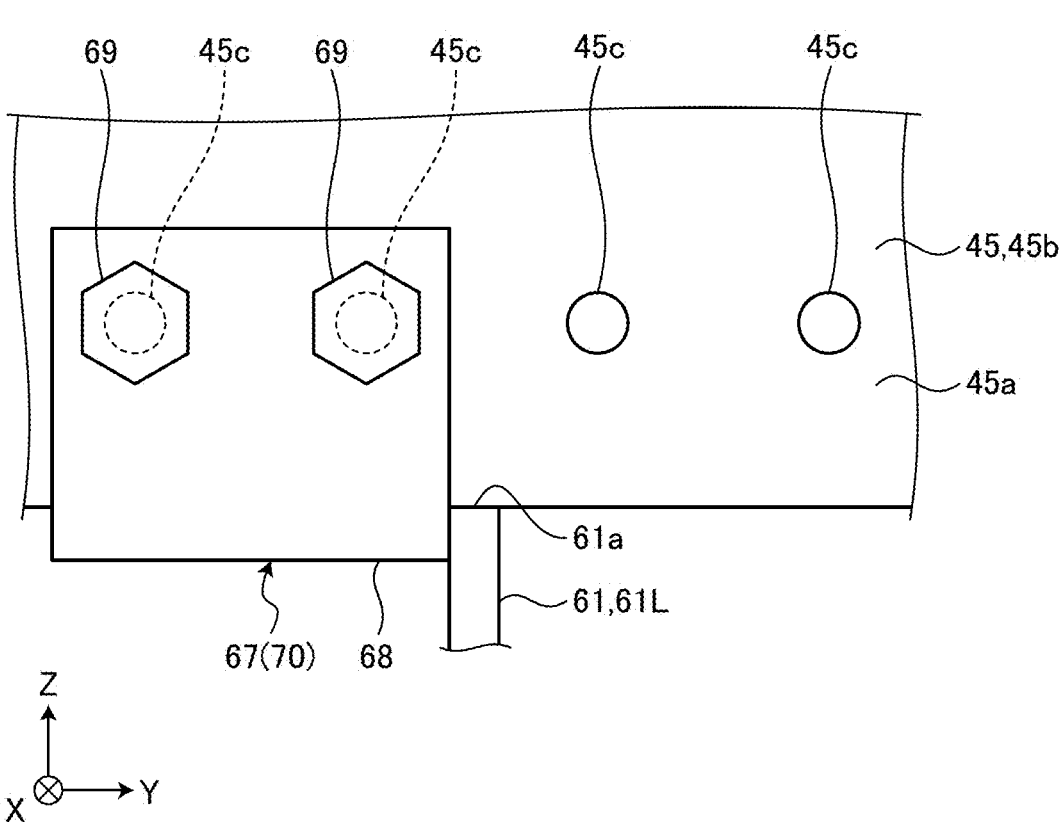
FIG. 9 is a diagram illustrating a width direction adjuster in the plate position adjuster of the object imaging apparatus according to the first embodiment.

FIG. 8 is a diagram illustrating an up-down direction adjuster 64 in the plate position adjuster 70 of the object imaging apparatus 20 according to the first embodiment. FIG. 9 is a diagram illustrating a width direction adjuster 67 in the plate position adjuster 70 of the object imaging apparatus 20 according to the first embodiment. As illustrated in FIG. 7 to FIG. 9, the plate position adjuster 70 includes the up-down direction adjuster 64 (FIG. 7 and FIG. 8) and the width direction adjuster 67 (FIG. 9).

As illustrated in FIG. 7 and FIG. 8, the up-down direction adjuster 64 includes a first plate member joint 62*b*, a second plate member joint 63*b*, a male screw member 65, and a female screw member 66.

The first plate member joint 62*b* is a part of the first plate member 62. The first plate member joint 62*b* is provided with a through-hole 62*a*.

The second plate member joint 63*b* is a part of the second plate member 63. The second plate member joint 63*b* is provided with an elongated hole 63*a* of which the longitudinal direction is the up-down direction, that is, the direction in which the optical unit 21 and the belt 12 face each other (i.e., the Z-direction). The elongated hole 63*a* penetrates the second plate member 63 in the width direction of the belt 12 (i.e., the Y-direction).

The male screw member 65 is inserted into the through-hole 62*a* of the first plate member joint 62*b* and the elongated hole 63*a* of the second plate member joint 63*b*, and is coupled to the female screw member 66. The male screw member 65 couples (fixes) the second plate member 63 to the first plate member 62 with the female screw member 66. For example, the male screw member 65 is a bolt, and the female screw member 66 is a nut. This configuration allows the second plate member 63 to move relative to the first plate member 62 in the up-down direction, that is, in the direction in which the optical unit 21 and the belt 12 face each other (i.e., the Z-direction) when the male screw member 65 is loosened. Thus, the position of the lower end 61*b* of the side plate 61 is adjusted. The position of the lower end 61*b* of the side plate 61 is an example of the position of the side plate 61 in the up-down direction, that is, the direction in which the optical unit 21 and the belt 12 face each other (i.e., the Z-direction).

As illustrated in FIG. 9, the width direction adjuster 67 includes a beam joint 45*a*, a plate joint 68, multiple male screw members 69, and a female screw member.

The beam joint 45*a* is included in a wall 45*b* constituting the beam 45. The beam joint 45*a* is provided with multiple through-holes 45*c*. The through-holes 45*c* are arranged along the width direction of the belt 12 (i.e., the Y-direction).

The plate joint 68 is located in the upper end 61*a* of the side plate 61. The plate joint 68 is, for example, a metal fitting (e.g., bracket).

The male screw members 69 are inserted into the through-holes 45*c* of the beam joint 45*a* through the plate joint 68, and are coupled to female screw members. The male screw members 69 couple (fix) the plate joint 68 to the beam joint 45*a* by the female screw members. In other words, the male screw members 69 couple the side plate 61 to the beam 45 with the female screw members. For example, the male screw members 69 are bolts, and the female screw members are nuts. The position of the side plate 61 in the width direction of the belt 12 is set to a position corresponding to two or more through-holes 45c into which the male screw members 69 are inserted among the through-holes 45c of beam joint 45a. Thus, the interval between the two side plates 61 in the width direction of the belt 12 is adjusted.

As illustrated in FIG. 7, a face 61c facing the space 100 in the side plate 61 includes a first portion 61ca and a second portion 61cb. The first portion 61ca is located away from the belt 12. The second portion 61cb is closer to the belt 12 relative to the first portion 61ca. The second portion 61cb is within a range of a predetermined height T1 from the lower end 61b of the side plate 61. In the present embodiment, the second portion 61cb is the entirety of the face 61c of the second plate member 63. Alternatively, the second portion 61cb may be a part of the face 61c of the second plate member 63, or may be the entirety of the face 61c of the second plate member 63 and a part of the face 61c of the first plate member 62. The height T1 of the second portion 61cb in the direction in which the housing 31 and the belt 12 face each other is set based on the shape of the object 5. The height T1 is set based on, for example, the shape of the object 5 in a predetermined orientation. For example, when the object 5 is a plastic bottle, a bottle, a can, or the like, the height T1 is set to be a value greater than the maximum diameter of the object 5 since the object 5 is placed in a state of being laid down on the upper face 12a of the belt 12. For example, when the object 5 is a bottle, the height T1 is a height obtained by adding an up-down-direction movement amount (e.g., 33 mm) of the side plate 61 at the time of installation, a deviation amount (e.g., 10 mm) in the height direction due to the unevenness of the upper face 12a of the belt 12, a deviation amount (e.g., 10 mm) of the angle of view of the imager 32, and a margin (e.g., 30 mm) to the diameter (e.g., 100 mm) of the largest-size bottle. Thus, the second portion 61cb faces the entirety of the object 5 lying on the upper face 12a of the belt 12 in the width direction of the belt 12. The reflectance of the second portion 61cb is lower than the reflectance of the first portion 61ca.

Figure 10:
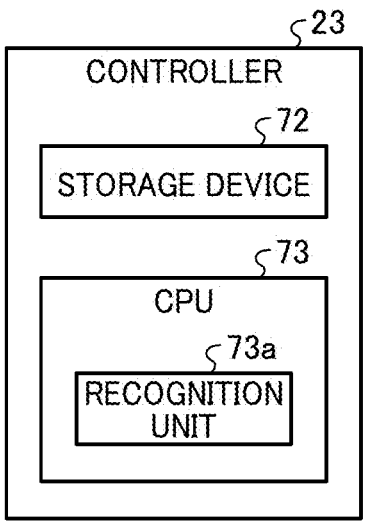
FIG. 10 is a block diagram illustrating the configuration of a controller of the object recognition apparatus according to the first embodiment.

FIG. 10 is a block diagram illustrating the configuration of the controller 23 of the object recognition apparatus 3 according to the first embodiment.

As illustrated in FIG. 10, the controller 23 is a computer. The controller 23 includes a storage device 72 and a central processing unit (CPU) 73. The storage device 72 records a computer program to be installed in the controller 23 and records information used by the CPU 73. Examples of the storage device 72 include a memory such as a random-access memory (RAM) or a read-only memory (ROM), a fixed disk device such as a hard disk, and a solid state drive (SSD). The controller 23 may be fixed to, for example, the supporter 22 as illustrated in FIG. 1.

The CPU 73 performs various types of processing and control by executing the computer program installed in the controller 23. The computer program installed in the controller 23 includes one or multiple computer programs for causing the controller 23 to implement multiple functions. The functions include at least a recognition unit 73a. In other words, the CPU 73 implements the recognition unit 73a by executing the computer program installed in the controller 23.

The recognition unit 73a recognizes the object 5 based on a captured image obtained by imaging the object 5 by the optical unit 21. For example, the recognition unit 73a recognizes the shape, position, color, material, and the like of the object 5 by performing image processing on the captured image.

Figure 11:
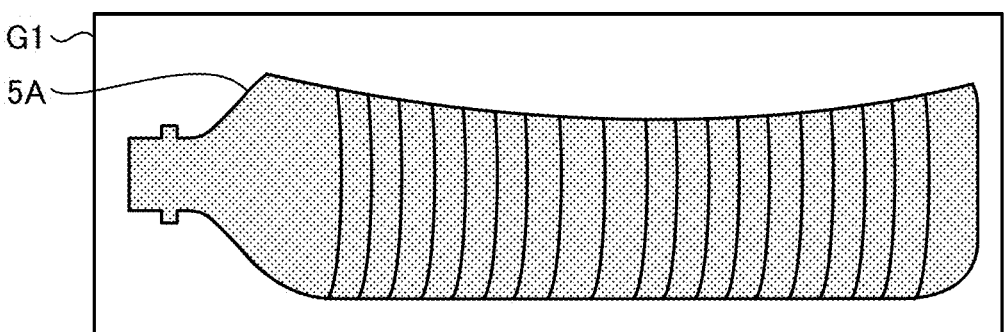
FIG. 11 is a diagram illustrating an example of a captured image according to a comparative example.
Figure 12:
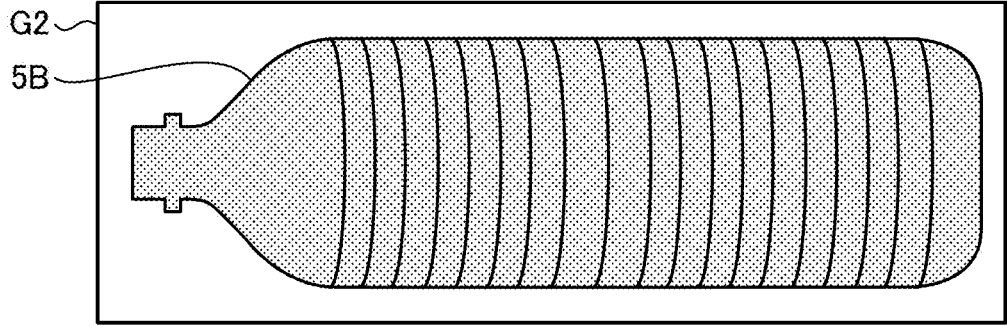
FIG. 12 is a diagram illustrating an example of a captured image according to the first embodiment.

The influence of the reflectance of the face 61c of the side plate 61 on the captured image is described below with reference to FIG. 11 and FIG. 12. FIG. 11 is a diagram illustrating an example of the captured image according to a comparative example. FIG. 12 is a diagram illustrating an example of the captured image according to the first embodiment. In the comparative example, the reflectance of the second portion 61cb of the face 61c of the side plate 61 is equal to the reflectance of the first portion 61ca of the face 61c, and the reflectance of the entirety of the face 61c is relatively high.

As illustrated in FIG. 11, according to the comparative example, in an object image G1, which is an image of the object 5 in a captured image 5A, the contour of the object 5 facing the side plate 61 is sometimes not clearly visible. Such an unclear image is considered to occur because the reflectance of the side plate 61 is high as a whole, and thus a large amount of light is reflected from the side plate 61 to the object 5.

On the other hand, according to the present embodiment, as illustrated in FIG. 12, in an object image G2, which is an image of the object 5 in a captured image 5B, the contour of the entirety of the object including the portion facing the side plate 61 is clearly visible. This is because the reflectance of the second portion 61cb of the side plate 61 facing the object 5 is lower than the reflectance of the first portion 61ca, and thus the amount of light reflected from the second portion 61cb to the object 5 is small.

As described above, the object imaging apparatus 20 according to the present embodiment includes the housing 31, the light sources 33, the first area R1, the second area R2, and the imager 32. The light sources 33 are provided inside the housing 31. The first area R1 is provided inside the housing 31 and diffusely reflects light from the light sources 33. The second area R2 is provided inside the housing 31 and guides at least a part of light from the light sources 33 to the first area R1. The imager 32 images the object 5 irradiated with light from the first area R1. The diffuse reflectance of the first area R1 is higher than the diffuse reflectance of the second area R2.

With such a configuration, the second area R2 guides at least a part of light from the light sources 33 to the first area R1. Accordingly, the light from the light sources is more concentrated in the first area R1 than a configuration in which the second area R2 does not guide the light from the light sources 33 to the first area R1. Further, since the diffuse reflectance of the first area R1 is higher than the diffuse reflectance of the second area R2, light that spreads from the first area R1, that is, light such as light from an area light source is emitted to the object 5, compared with when the diffuse reflectance of the first area R1 is equal to or lower than the diffuse reflectance of the second area R2. This prevents bright spots from appearing on the object 5. Accordingly, the object 5 can be imaged more clearly than when the diffuse reflectance of the first area R1 is equal to or lower than the diffuse reflectance of the second area R2.

The housing 31 is located facing the belt 12 that conveys the object 5. The inside of the housing 31 is opened to the belt 12 (conveyor). The length L2 between the second area R2 and the belt 12 is shorter than the length L1 between the first area R1 and the belt 12.

With such a configuration, dust or the like on the belt 12 may enter the inside of the housing and reach the second area R2 near the belt 12. In view of this, according to the present embodiment, the diffuse reflectance of the first area R1 is higher than the diffuse reflectance of the second area R2. In other words, the diffuse reflectance of the second area R2 is lower than the diffuse reflectance of the first area R1, and the second area R2 is smoother than the first area R1. Accordingly, the second area R2 is less likely to get dirty. Further, since the diffuse reflectance of the second area R2 is lower than the diffuse reflectance of the first area R1 and the smoothness of the second area R2 is higher than the first area R1, even when the second area R2 gets dirty, the dirt is easily wiped off. Thus, the ease of cleaning the housing 31 enhances.

The housing 31 includes the base face 31$m$ and the side faces 31$n$. The base face 31$m$ is located away from the belt 12. The side faces 31$n$ extend from the base face 31$m$ toward the belt 12. The first area R1 is provided on the base face 31$m$, and the second area R2 is provided on each of the side faces 31$n$.

With such a configuration, the base face 31$m$ is less likely to get dirty.

The first area R1 extends in a direction intersecting the −Z-direction (the first direction) from the first area R1 toward the belt 12. The second area R2 extends along the −Z-direction relative to the first area R1.

With such a configuration, the first area R1 is further away from the belt 12, and therefore the first area R1 is less likely to get dirty.

The object imaging apparatus 20 includes the pair of side plates 61 (plates). The pair of side plates 61 (plates) are spaced apart in the width direction of the belt 12 and sandwich the space 100 between the housing 31 and the belt 12. The imager 32 can image the object 5 between the pair of side plates 61. The face 61$c$ of each of the side plates 61 (i.e., the right side plate 61R and the left side plate 61L) facing the space 100 includes the first portion 61$ca$ and the second portion 61$cb$. The first portion 61$ca$ is located away from the belt 12. The second portion 61$cb$ is closer to the belt 12 relative to the first portion 61$ca$. The reflectance of the second portion 61$cb$ is lower than the reflectance of the first portion 61$ca$.

With such a configuration, since the reflectance of the second portion 61$cb$ is lower than the reflectance of the first portion 61$ca$, the object 5 can be imaged more clearly even when the object 5 is formed of a transparent material. Accordingly, the shape of the object 5 that is transparent is consistently recognized. Thus, the recognition accuracy enhances. Further, with the above-described configuration, the pair of side plates 61 can reduce or prevent disturbance light.

According to the present embodiment, the height of the second portion 61$cb$ in the direction in which the housing 31 and the belt 12 face each other is set based on the shape of the object 5.

According to such a configuration, the height of the second portion 61$cb$ can be set to an appropriate height.

The object imaging apparatus 20 includes the plate position adjuster 70. The plate position adjuster 70 can adjust at least one of the interval between the pair of side plates 61 in the width direction and the positions of the pair of side plates 61 in the direction in which the housing 31 and the belt 12 face each other.

With such a configuration, the positions of the pair of side plates 61 can be adjusted based on the arrangement of the belt conveyor 2 and the width and height of the belt conveyor 2.

The object recognition apparatus 3 includes the object imaging apparatus 20 and the recognition unit 73$a$. The recognition unit 73$a$ recognizes the object 5 based on a captured image obtained by imaging the object 5 by the imager 32.

With such a configuration, the object 5 can be imaged more clearly by the object imaging apparatus 20.

Figure 13:
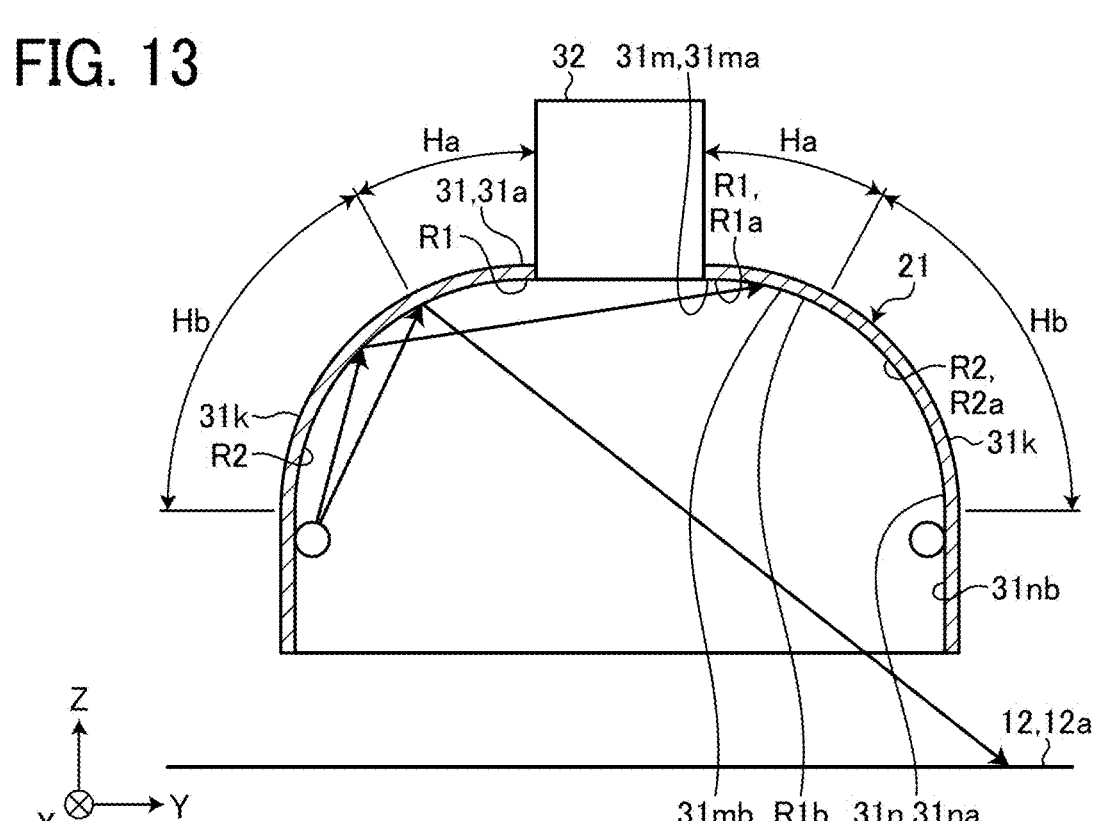
FIG. 13 is a cross-sectional view of an optical unit according to the second embodiment.

Second Embodiment FIG. 13 is a cross-sectional view of the optical unit 21 according to the second embodiment.

As illustrated in FIG. 13, the present embodiment is different from the first embodiment in the shape of the housing 31 of the optical unit 21 and the shapes of the first area R1 and the second area R2. In FIG. 13, a range Ha of the first area R1 and a range Hb of the second area R2 in the cross section of the housing 31 are indicated by dimensional lines.

The upper portion of the housing 31 is substantially dome-shaped. The base face 31$m$ has a flat face 31$ma$ and a concave face 31$mb$ according to the shape of the housing 31. The first area R1 has a flat face Ria and a concave face Rib. The flat face Ria of the first area R1 is the entirety or a part of the flat face 31$ma$ of the base face 31$m$. The concave face Rib of the first area R1 is the entirety or a part of the concave face 31$mb$ of the base face 31$m$. The flat face 31$ma$ and the flat face Ria extend in a direction intersecting the −Z-direction. The flat face 31$ma$ and the flat face Ria may extend in a direction perpendicular to the −Z-direction or may extend in a direction inclined relative to the −Z-direction. The concave face 31$mb$ and the concave face Rib are farther from the flat face 31$ma$ and the flat face R1$a$ in a direction intersecting the −Z-direction (i.e., a direction along the X-Y plane) as the concave face 31$mb$ and the concave face Rib extend in the −Z-direction.

The side face 31$n$ of the housing 31 includes a concave face 31$na$ and a vertical face 31$nb$. The second area R2 includes a concave face R2$a$. The concave face R2$a$ of the second area R2 is the entirety or a part of the concave face 31$na$ of the side face 31$n$. The flat face 31$ma$ and the flat face R1$a$ extend in a direction intersecting the −Z-direction. The flat face 31$ma$ and the flat face R1$a$ may extend in a direction perpendicular to the −Z-direction or may extend in a direction inclined relative to the −Z-direction. The concave faces 31$na$ and the concave face R2$a$ are farther from the base face 31$m$ and the first area R1 in the direction intersecting the −Z-direction (i.e., the direction along the X-Y plane) as the concave face 31$na$ and the concave face R2$a$ extend in the −Z-direction. The vertical face 31$nb$ of the side face 31$n$ extends along the −Z-direction from the concave face 31$na$ of the side face 31$n$.

With such a configuration, the width of the upper portion of the housing 31 can be reduced in a simple manner. This makes it easier to install the optical unit 21.

Figure 14:
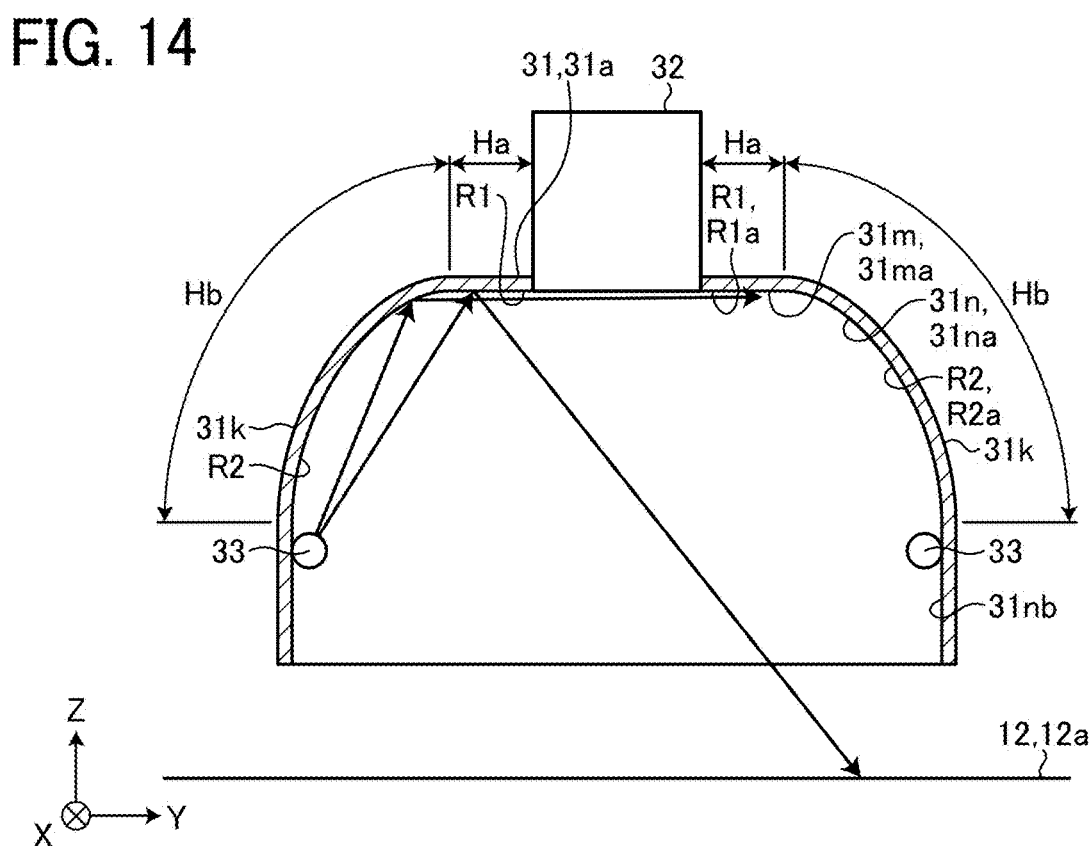
FIG. 14 is a cross-sectional view of an optical unit according to the third embodiment.

Third Embodiment FIG. 14 is a cross-sectional view of the optical unit 21 according to the third embodiment.

As illustrated in FIG. 14, the present embodiment is different from the second embodiment in the shape of the housing 31 of the optical unit 21 and the shapes of the first area R1 and the second area R2. In FIG. 14, a range Ha of the first area R1 and a range Hb of the second area R2 in the cross section of the housing 31 are indicated by dimensional lines.

In the present embodiment, the base face 31$m$ includes the flat face 31$ma$ but does not include the concave face 31$mb$ (FIG. 13). The first area R1 includes the flat face Ria but does not include the concave face Rib. The side face 31$n$ and the second area R2 are the same or substantially the same as those in the second embodiment.

With such a configuration, the width of the upper portion of the housing 31 can be reduced in a simple manner. This makes it easier to install the optical unit 21.

An object to be imaged or recognized in the above-described embodiments is not limited to recyclable waste. The object to be imaged or recognized in the above-described embodiments may be, for example, an object to be inspected or an object to be sorted. The object to be inspected and the object to be sorted may be a product such as a manufactured product, an agricultural product, and a marine product.

It is desirable that object imaging apparatuses as described in the background images an object more clearly.

According to one or more embodiments, the object imaging apparatus and the object recognition apparatus can image an object more clearly.

The above-described embodiments are illustrative and do not limit the present disclosure. Thus, numerous additional modifications and variations are possible in light of the above teachings. The above-described elements can be combined with each other appropriately. Some of the elements of the above-described embodiments may be omitted, substituted for each other, and/or changed within the scope of the present disclosure.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. An object imaging apparatus, comprising:
a housing;
a light source inside the housing;
a first reflector inside the housing to diffusely reflect light from the light source;
a second reflector inside the housing to guide at least a part of light from the light source to the first reflector; and
an imager to image an object irradiated with the light from the first reflector,
wherein a diffuse reflectance of the first reflector is higher than a diffuse reflectance of the second reflector.

2. The object imaging apparatus according to claim 1, wherein the housing is located facing a conveyor to convey the object,
the housing is open to the conveyor, and
a distance between the second reflector and the conveyor is shorter than a distance between the first reflector and the conveyor.

3. The object imaging apparatus according to claim 2, wherein the housing includes:
a base face away from the conveyor; and
a side face extending from the base face toward the conveyor, and
wherein the first reflector is provided on the base face, and the second reflector is provided on the side face.

4. The object imaging apparatus according to claim 2, wherein
the first reflector extends in a direction intersecting a first direction from the first reflector toward the conveyor, and
the second reflector extends along the first direction relative to the first reflector.

5. The object imaging apparatus according to claim 2, wherein
the second reflector has a concave face that is recessed toward an outside of the housing and is farther from the first reflector in a direction intersecting a first direction, which is a direction from the first reflector to the conveyor, as the concave face extends in the first direction.

6. The object imaging apparatus according to claim 2, further comprising a pair of plates spaced apart in a width direction of the conveyor and sandwiching a space between the housing and the conveyor, wherein
the imager is configured to image an object between the pair of plates,
each of the pair of plates has a face facing the space, the face has a first portion that is away from the conveyor and a second portion closer to the conveyor relative to the first portion, and
a reflectance of the second portion is lower than a reflectance of the first portion.

7. The object imaging apparatus according to claim 6, wherein a height of the second portion in a direction in which the housing and the conveyor face each other is set based on a shape of the object.

8. The object imaging apparatus according to claim 6, further comprising a plate position adjuster to adjust at least one of a distance between the pair of plates in the width direction and positions of the pair of plates in a direction in which the housing and the conveyor face each other.

9. The object imaging apparatus according to claim 1, wherein the housing includes:
a base face; and
a side face extending from the base face in a first direction,
wherein the imager is disposed at the base face and has an optical axis oriented along the first direction.

10. An object recognition apparatus, comprising:
the object imaging apparatus according to claim 1; and
circuitry configured to recognize the object based on a captured image obtained by imaging the object by the imager.

\* \* \* \* \*